United States Patent [19]

Kennedy, III et al.

[11] Patent Number: 5,762,573
[45] Date of Patent: Jun. 9, 1998

[54] GAME BALL WITH A HOLOGRAM IMAGE

[75] Inventors: Thomas J. Kennedy, III, Wilbraham; Dennis Nesbitt, Westfield, both of Mass.

[73] Assignee: Lisco, Inc., Tampa, Fla.

[21] Appl. No.: 663,393

[22] Filed: Jun. 13, 1996

[51] Int. Cl.⁶ .................................................. A63B 43/00
[52] U.S. Cl. ........................... 473/570; 473/604; 40/327
[58] Field of Search ........................... 473/570, 571, 473/600, 601, 602, 604, 605; 40/327

[56] References Cited

U.S. PATENT DOCUMENTS

| | | | |
|---|---|---|---|
| 4,234,643 | 11/1980 | Grotefend et al. | 40/327 |
| 4,503,635 | 3/1985 | Harrington . | |
| 4,681,324 | 7/1987 | Karabed . | |
| 4,728,377 | 3/1988 | Gallagher | 350/162.17 |
| 4,893,887 | 1/1990 | Coates | 350/3.6 |
| 4,913,504 | 4/1990 | Gallagher | 350/3.6 |
| 4,998,734 | 3/1991 | Meyer . | |
| 5,320,345 | 6/1994 | Lai . | |
| 5,330,184 | 7/1994 | Douglas . | |
| 5,405,469 | 4/1995 | Lin . | |
| 5,427,378 | 6/1995 | Murphy . | |
| 5,470,058 | 11/1995 | Sullivan et al. | 473/570 |
| 5,517,336 | 5/1996 | Molee | 359/1 |

*Primary Examiner*—Steven B. Wong

[57] ABSTRACT

An object with a hologram image and method of fabrication comprising a first outermost layer. Such first layer has an exterior surface and an interior surface. The first layer is formed of a coating with a diffraction grating on its interior most surface. The first layer is coated with a solution, either solvent or water born, and is of a transparent material which is an ultraviolet stabilized polymer. The material of the first layer is an acrylic polymer, preferably polyurethane and constitutes a flexible metalized sheet. A second layer has an exterior surface and an interior surface. The second layer is formed of a reflective layer of aluminum deposit vacuum. A third innermost layer has an exterior surface and an interior surface. The third layer is formed of hot melt adhesive.

5 Claims, 4 Drawing Sheets

GAME BALL WITH A HOLOGRAM IMAGE

BACKGROUND OF THE INVENTION

1. Field of the Invention

The present invention relates to an improved game ball with a hologram image and method of fabrication and, more particularly, pertains to providing holographic indicia onto the exterior surface of a spherical game ball or to other objects of various shapes to enhance their appearance.

2. Description of the Prior Art

The use of game balls and other objects with indicia, whether a logo, instructions, an image of a star athlete, or the like on their exterior surfaces of various designs and configurations is known in the prior art. More specifically, game balls and other objects with indicia on their exterior surfaces of various designs and configurations heretofore devised and utilized for the purpose of enhancing the appearance and appeal through such holographic images are known to consist basically of familiar, expected and obvious structural configurations, notwithstanding the myriad of designs encompassed by the prior art which have been developed for the fulfillment of countless objectives and requirements.

By way of example, the prior art in U.S. Pat. No. 4,503,635 to Harrington discloses a molded flying disc with weighted outer ring. U.S. Pat. No. 4,681,324 to Karabed et al., discloses holographic game cards. U.S. Pat. No. 4,998,734 to Meyer discloses a golf ball. U.S. Pat. No. 5,320,345 to Lai et al., discloses a game ball with transparent cover. U.S. Pat. No. 5,330,184 to Douglas discloses a rubber compound for hockey pucks. U.S. Pat. No. 5,405,469 to Lin discloses a method for forming a globe map on rubber basketballs. Lastly, U.S. Pat. No. 5,427,378 to Murphy discloses a golf ball and method of making same.

In this respect, the improved game ball system with a hologram image according to the present invention substantially departs from the conventional concepts and designs of the prior art, and in so doing provides an apparatus primarily developed for the purpose of providing a holographic image or indicia to the exterior surface of a spherical game ball or to other objects of various shapes to enhance their appearance and appeal. A holographic image which is simple to apply and which will be retained in position despite continued handling.

Therefore, it can be appreciated that there exists a continuing need for game ball systems and other objects of various shapes with hologram images on their exterior surfaces to enhance their appearance and appeal. In this regard, the present invention substantially fulfills this need.

SUMMARY OF THE INVENTION

In view of the known disadvantages inherent in the known types of game balls and other objects with images on their exterior surfaces of various designs and configurations now present in the prior art, the present invention provides an improved game ball system with a hologram image. As such, the general purpose of the present invention, which will be described subsequently in greater detail, is to provide a new and improved game ball system with a hologram image apparatus and method which has all the advantages of the prior art and none of the disadvantages.

To attain this, the present invention essentially comprises a game ball system with a hologram image and method of fabrication comprising, in combination, a game ball. The game ball is in a spherical configuration and has an exterior surface with a spherical configuration. An innermost first layer has an exterior surface and an interior surface coupled with respect to the exterior surface of the game ball. Such first layer is formed of hot melt adhesive and has a thickness of between about 0.001 and about 0.020 inches. A second next adjacent layer has an exterior surface and an interior surface and is coupled with respect to the exterior surface of the first layer. Such second layer may also be a layer containing pigment with a thickness between about 0.0001 and 0.0200 inches, such that the colored layer may act as a background or shading effect on the final indicia when applied to the game ball. The second layer is formed of a reflective layer of vacuum deposited aluminum or chrome, indium and the like. Such second layer has a thickness of between about 0.0001 and about 0.0010 inches. A third next adjacent layer has an exterior surface and an interior surface and is coupled with respect to the exterior surface of the second layer. An aluminum coating may also be transferred preferentially to the clear diffraction grating coating through the use of an adhesive that is applied to the clear grating layer in the desired pattern. The third layer is formed of a coating with a diffraction grating on its interior most surface adjacent the second layer. The third layer constitutes the top of a label defined by the first, second and third layers. The third layer is coated with a solution, either solvent or water born, and is of a transparent material which is an ultraviolet stabilized polymer. The third layer has a thickness of between about 0.0001 and 0.0200 inches, preferably between 0.002 and 0.010 inches. The material of the third layer is an polyurethane polymer, preferably a polyester or acrylic polyurethane and constitutes a flexible metalized sheet. A fourth layer has an exterior surface and an interior surface coupled to the exterior surface of the third layer. The fourth layer is a releasable film coating selected from the class of releasable coatings including hard wax and silicone. A fifth layer has an exterior surface and an interior surface coupled with the exterior surface of the fourth layer. The fifth layer constitutes a film carrier fabricated of a plastic sheet, preferably polyethylene terephthale.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved game ball system with a hologram image which has all the advantages of the prior art game balls and other objects with images and indicia on their exterior surfaces and none of the disadvantages.

It is another object of the present invention to provide a new and improved game ball system with a hologram image which may be easily and efficiently manufactured and marketed.

It is a further object of the present invention to provide a new and improved game ball system with a hologram image which is of a durable and reliable construction despite continued handling.

An even further object of the present invention is to provide a new and improved game ball system with a hologram image which is susceptible of a low cost of manufacture with regard to both materials and labor, and which accordingly is then susceptible of low prices of sale to the consuming public, thereby making such game balls and other objects with images and indicia economically available to the buying public.

Still another object of the present invention is to provide a holographic image to the exterior surface of a spherical game ball or other objects of various shape to enhance its appearance.

Lastly, it is an object of the present invention to provide a new and improved object with a hologram image comprising a first outermost layer. Such first layer has an exterior surface and an interior surface. The first layer is formed of a coating with a diffraction grating on its interior most surface. The material of the first layer is a polyurethane polymer, preferably polyester polyurethane and constitutes a flexible metalized sheet. A second layer has an exterior surface and an interior surface. The second layer is formed of a reflective layer of aluminum deposit vacuum. A third innermost layer has an exterior surface and an interior surface. The third layer is formed of hot melt adhesive.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
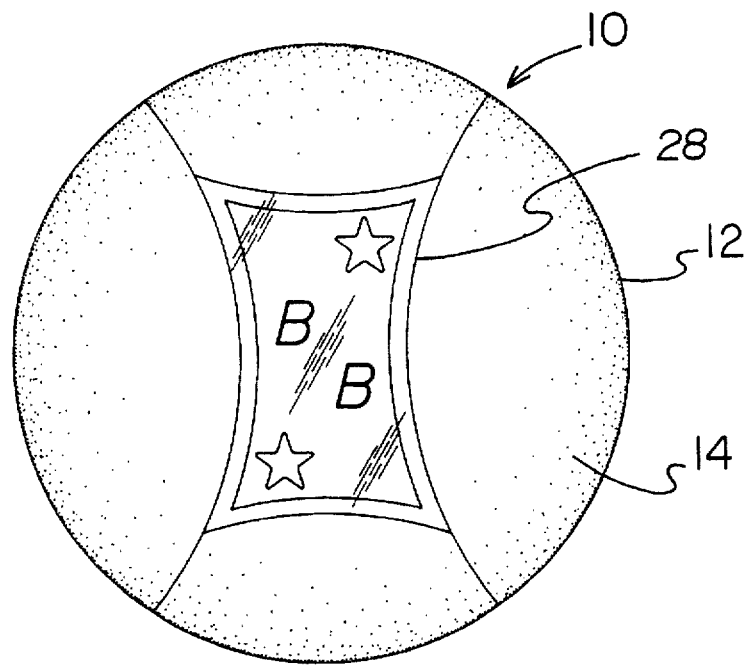
FIG. 1 is a perspective illustration of the preferred embodiment of the new and improved game ball system with a hologram image constructed in accordance with the principles of the present invention.
Figure 2:
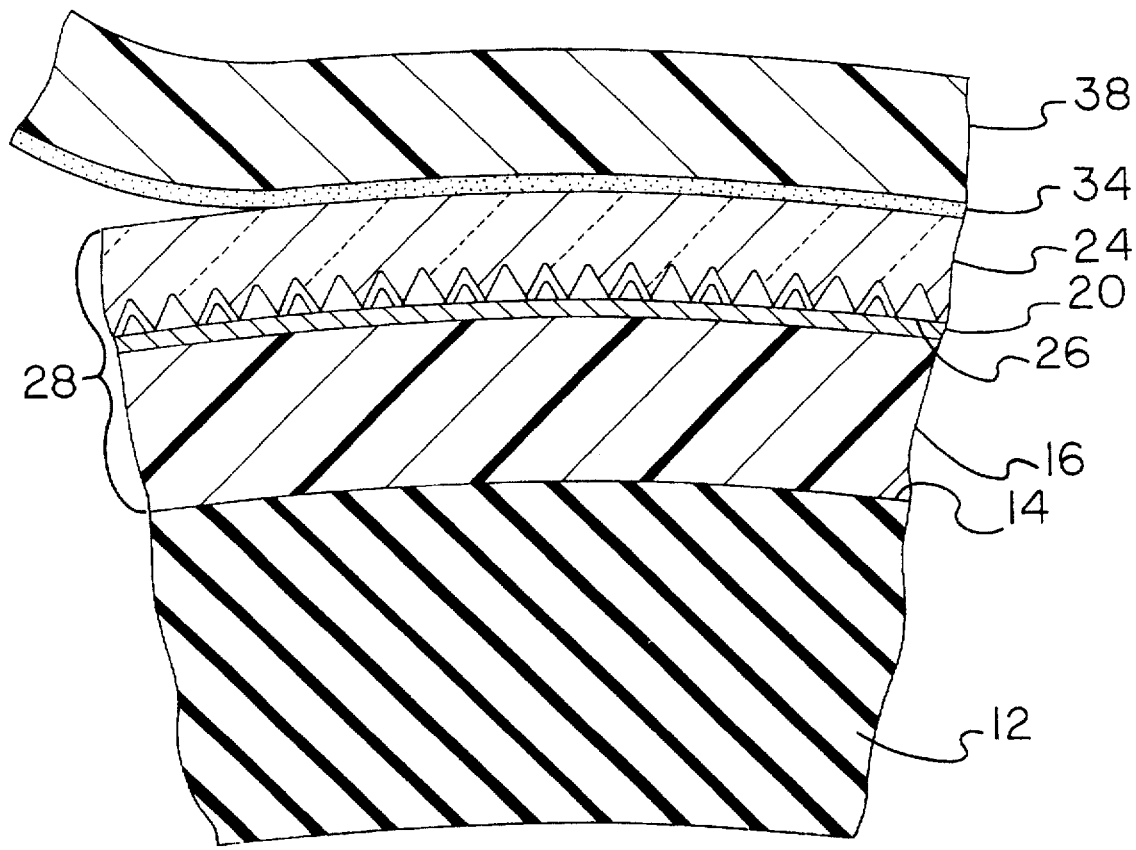
FIG. 2 is a cross sectional view through a portion of the game ball system with a hologram image as shown in FIG. 1.

With reference now to the drawings, and in particular to FIG. 1 thereof, a new and improved game ball system with a hologram image embodying the principles and concepts of the present invention and generally designated by the reference numeral 10 will be described.

The present invention, the new and improved game ball system with a hologram image, is comprised of a plurality of components. Such components in their broadest context include a ball, a first layer, a second layer, a third layer, a fourth layer and a fifth layer. Such components are individually configured and correlated with respect to each other so as to attain the desired objective.

The present invention is a system 10. The system 10 includes a game ball 12. The game ball is in a spherical configuration and is shown as a pneumatic basketball for the sake of illustration. The game ball has an exterior surface 14 in a spherical configuration. The game ball further includes an innermost first layer 16. Such first layer has an exterior surface and an interior surface. The exterior surface and interior surface are coupled with respect to the exterior surface of the game ball. Such first layer is formed of hot melt adhesive, preferably an isophtalic acid, phthalic acid or adipic acid polyester. The first layer has a thickness of between about 0.001 and about 0.020 inches, preferably about 0.005 to 0.010 inches.

The next layer may be a color or pigment layer 50. Note FIGS. 7 and 8. This layer gives a background to the metalized layer and/or a shadowing effect. Such is between about 0.0001 and 0.0200 inches thick, preferably between about 0.005 and 0.010 inches.

Figure 7:
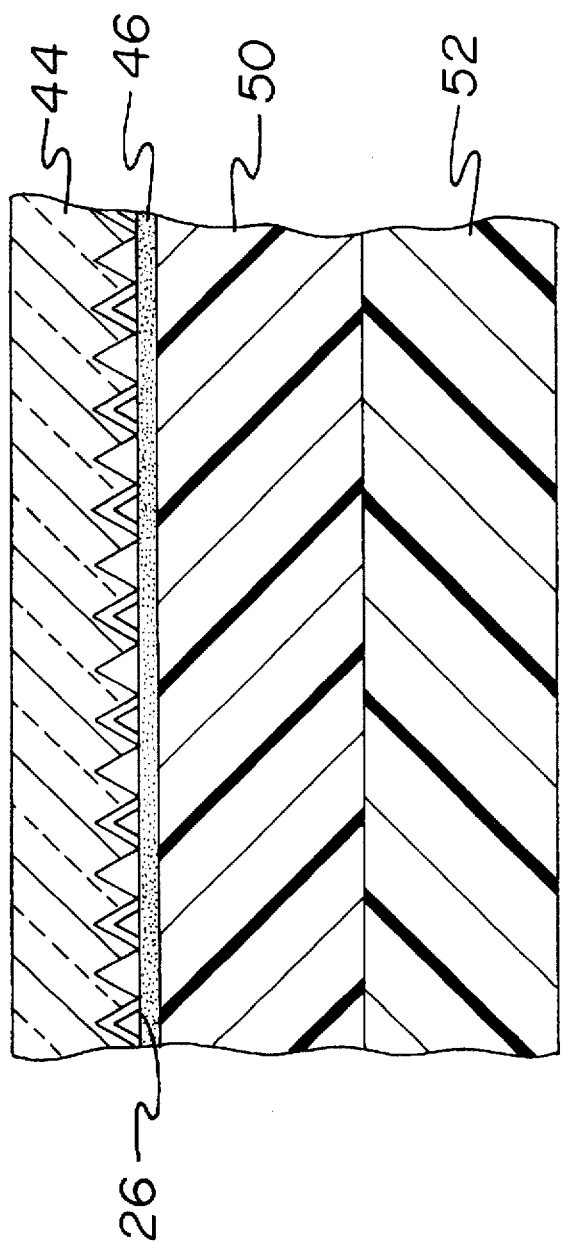
FIG. 7 is an enlarged cross sectional view similar to FIG. 5 but illustrating an alternate embodiment of the invention wherein a color layer is provided between the hot melt adhesive and the reflective layer.
Figure 8:
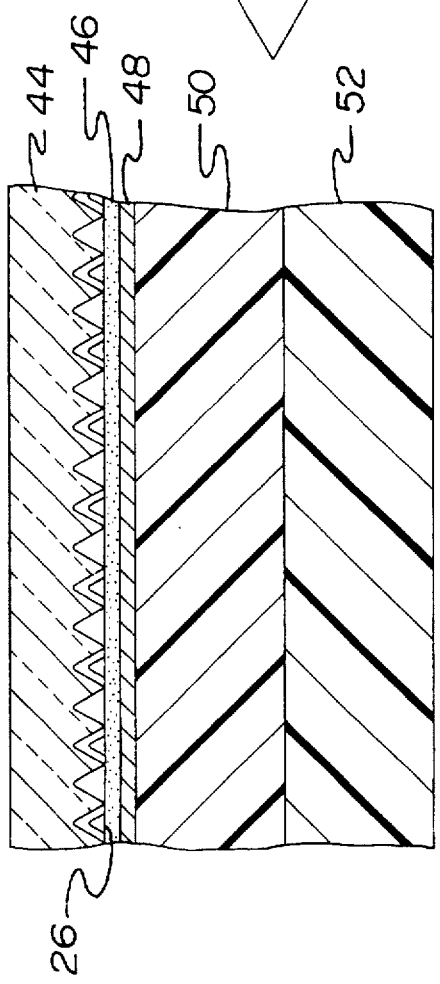
FIG. 8 includes the adhesive layer and color layer of FIGS. 6 and 7.

In this alternate embodiment, as shown in FIGS. 7 and 8, the color or pigment layer is between the hot melt adhesive and the reflective layer. This allows for its shadowing effects and different color background. The pigment may be incorporated into the hot melt layer or be a separate layer unto itself. However, when part of the hot melt adhesive, this necessitates that a balance be struck between the adhesive capabilities of the hot melt adhesive and the opacity of the color A higher pigment concentration allows for less adhesion. Such reflective layer need not be restricted to aluminum. Silver and indium are also commonly utilized for applications of this type. Silver has the highest reflectivity and indium allows for more flexibility at higher film thicknesses.

Next provided is a second or next adjacent layer 20. The second layer has an exterior surface and an interior surface. The exterior surface and interior surface are coupled with respect to the exterior surface of the first layer. The second layer is formed of a reflective layer of aluminum deposit vacuum. Such second layer has a thickness of between about 0.0001 and about 0.0010 inches, preferably about 0.0005 to 0.0010 inches.

Next provided is a third or next adjacent layer 24. Such third layer also has an exterior surface and an interior surface. The exterior surface and interior surface are coupled with respect to the exterior surface of the second layer. The third layer is formed of a coating with a diffraction grating 26 on its interior most surface adjacent the second layer. The third layer constitutes the top of a label 28 defined by the first, second and third layers. The third layer is fabricated of a transparent material which is an ultraviolet stabilized polymer. The third layer has a thickness of between about 0.0010 and 0.0200 inches, preferably between about 0.002 and 0.010 inches, most preferably about 0.005 inches. The material of the third layer is a polyurethane polymer, preferably polyester polyurethane and constitutes a flexible metalized sheet.

Next provided is a fourth layer 34. The fourth layer also has an exterior surface and an interior surface. Both the exterior surface and interior surface are coupled to the exterior surface of the third layer. The fourth layer is a releasable film coating. The film coating is selected from the class of releasable coatings including hard wax and silicone. Such fourth layer has a thickness of between about 0.0001 and 0.0010 inches, preferably about 0.0005 inches.

Further provided in the system 10 of the present invention is a fifth or outermost layer 38. The fifth layer has an exterior surface and an interior surface. The exterior surface and interior surface are coupled with the exterior surface of the fourth layer. The fifth layer constitutes a film carrier. Such film carrier is fabricated of a plastic sheet, preferably polyethylene terephthale. Such film carrier has a thickness of between about 0.001 and 0.020 inches, preferably about 0.006 inches.

In the first embodiment, the fourth and fifth layers are to be removed prior to using the ball. They are shown in dotted line configuration to illustrate such purpose. Such two outermost layers are simply used for handling the hologram materials prior to coupling to the ball. It should also be appreciated that although the primary embodiment is shown as a pneumatic basketball, it could be readily applied to other balls pneumatic or otherwise, such as volleyballs, soccer balls, baseballs and the like and are not limited to spherical balls since they could readily be applied to footballs or rugby balls.

Figure 3:
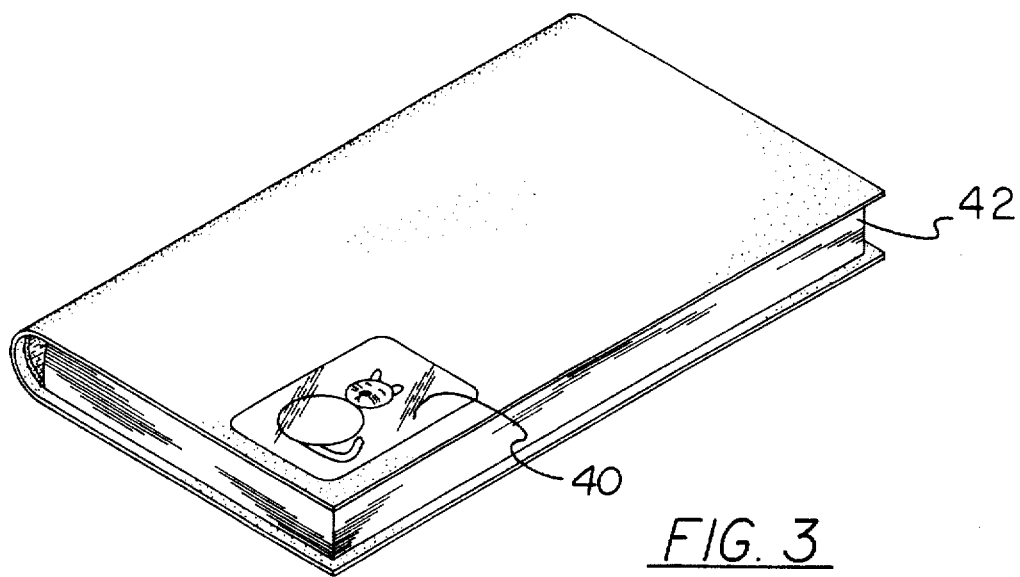
FIG. 3 is a perspective illustration of a planar object, the cover of a note book, constructed in accordance with an alternate embodiment of the invention.
Figure 4:
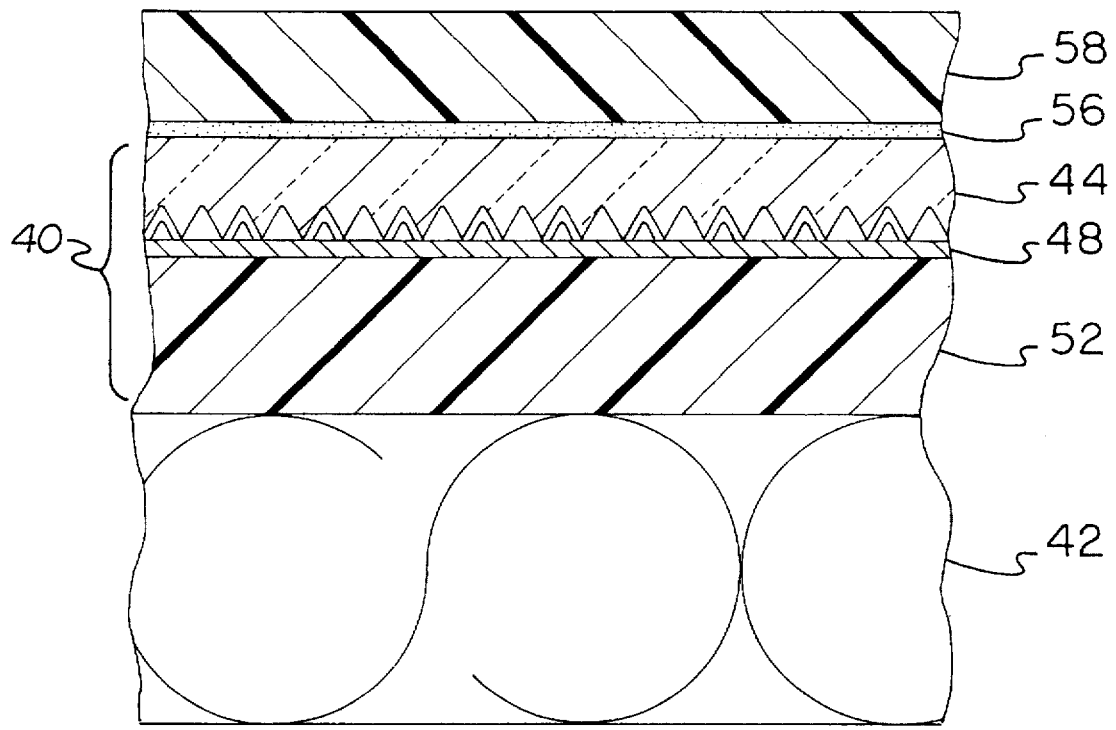
FIG. 4 is a cross sectional view taken through the object and hologram image shown in FIG. 3.

FIGS. 3 and 4 show an alternate embodiment of the present invention. Such embodiment is a hologram image 40 on a notebook 42. The image includes a first or outermost layer 44. The first outermost layer is essentially the same as the third layer of the primary embodiment.

There is further provided a second or intermediate layer 48. Thereafter there is further provided is a third or innermost layer 52. Such second and third layers are essentially the same as the second and first layers of the primary embodiment.

In this alternate embodiment of the present invention there is provided an innermost supplemental layer 56 similar in construction to the fourth layer of the primary embodiment as well as an outermost layer 58 similar in construction to the fifth layer of the primary embodiment. Such supplemental layers are to be removed after the hologram image is coupled to the notebook.

Figure 5:
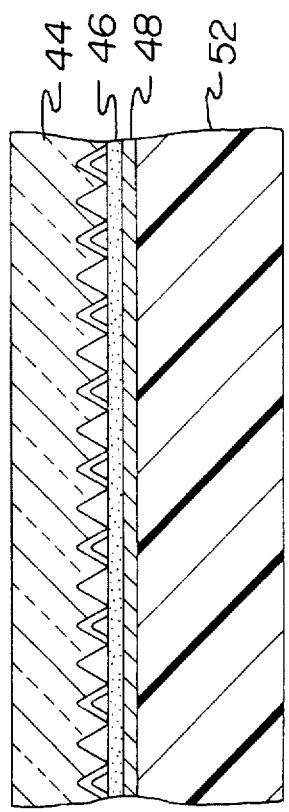
FIG. 5 is an enlarged cross sectional view of the image similar to that shown in FIG. 2 but with the uppermost layers removed.

FIG. 5 shows the basic label to be applied to an object but with the outermost layer and adhesive removed.

Figure 6:
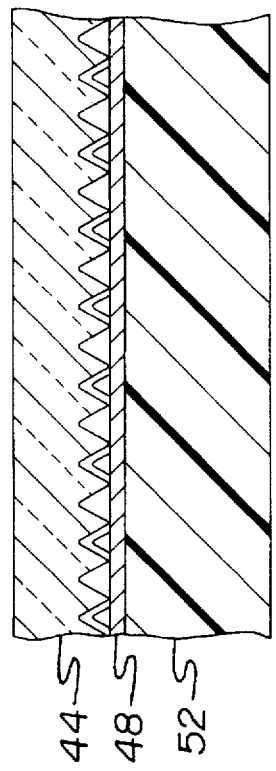
FIG. 6 is a view similar to that shown in FIG. 5 but illustrating an alternate embodiment of the invention with an adhesive layer between the grating layer and the reflective layer.
Figure 9:
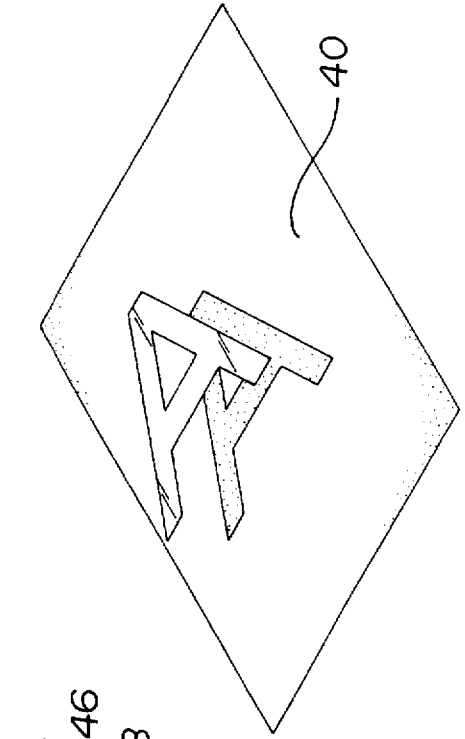
FIG. 9 is a perspective showing of the adhesive layer on the object to be provided with the hologram and the reflective laser material preferably placed in position through the adhesive.

An alternate embodiment of the invention is shown in FIGS. 6 and 8. In such embodiment, an adhesive layer 46 is provided between the intermediate reflective layer 48 and the outermost grating layer 44. The use of an adhesive at this location allows for the preferential transfer of the aluminum or other reflective area to declare grating layer. In such embodiment, the adhesive 46 is applied to selected areas in contact with the reflective material which may preferentially placed for a preferred visual appearance. The adhesive is applied in selected areas as shown in FIG. 9 with the reflective material and the adhesive of a common configuration. The adhesive and reflective material is applied over the entire plastic sheet or, in an alternate embodiment is applied over only part of the plastic sheet.

It should be realized that other objects in addition to a notebook could readily be utilized for receiving the hologram image of the present invention and that the planar surface of the notebook is done for illustration purposes only.

Further provided is a method for fabricating an object with a hologram image. Such method includes the steps of first providing an object, preferably in a spherical configuration. Such object has an exterior surface.

The next step is providing an innermost or first layer as described in the primary embodiment.

The next step is providing a second or next adjacent layer as described in the primary embodiment.

The next step is providing a third or next adjacent layer as described in the primary embodiment.

The next step is providing a fourth layer and a fifth layer as described in the primary embodiment.

The next steps are placing the innermost surface of the first layer on the exterior surface of the object followed by the step of removing the fourth and fifth layers from the exterior surface of the third layer.

The present invention is the use of holograms on game balls. Typically, a holograph is produced by embossing polyester film with a very fine pattern that acts as a diffraction grating. This film is either metalized in part or completely to give the holograph a shiny background so that the incident light is reflected.

Holographic labels are currently utilized in many products for authentication or aesthetic purposes. They are applied as either a hot stamp with a hot melt adhesive backing or as a label with a pressure sensitive adhesive backing. The durability of these indicia are fair for mild handling, for example, stocking a box on a shelf that has a holographic label on it. Some scratches result as the box is moved around. However, for a dynamic use, such as on a game ball, these labels are very poor for durability.

The present invention involves a plastic sheet such as PET. The sheet is coated with a release film such as a hard wax or a silicone polymer. The thickness of the polymer is from about 0.001 inches to 0.020 inches, with the preferred thickness being 0.002 to 0.010 inches. The polymer may be an acrylic, polyester, vinyl, polyurethane, alkyd, epoxy, silicone or melamine type coating. The most preferred type of coating is a polyurethane. The composite of film and coating is then embossed on the coating side with a very fine diffraction grating that was previously produced on a photographic or etched template, usually made of a flexible metal sheet. A reflective coating, usually aluminum is then applied to the sheet, either in part or across the entire sheet. This aluminum coating is either vacuum metalized onto the coating or transferred through the use of an adhesive that has been specifically placed onto the coating in the shape of the desired reflective indicia. A hot melt adhesive is then coated over the reflective portion of the coated film or in such a manner so that the hot melt adhesive allows for the transfer of the entire indicia when the coated film is pressed and heated onto the substrate that is to be decorated.

The present invention uses a thick, abrasion resistant coating with a hot melt that has a wide range of adhesion. This allows for the holograph to stay on the game ball during dynamic handling, such as playing basketball.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A new and improved game ball system with a hologram image comprising, in combination:

a game ball in a spherical configuration having an exterior surface with a spherical configuration;

an innermost first layer having an exterior surface and an interior surface coupled with respect to the exterior surface of the game ball, such first layer formed of hot melt adhesive having a thickness of between about 0.001 and about 0.020 inches;

a second next adjacent layer having an exterior surface and an interior surface coupled with respect to the exterior surface of the first layer, the second layer formed of a reflective layer of aluminum deposit vacuum, such second layer having a thickness of between about 0.0001 and about 0.0010 inches;

a third next adjacent layer having an exterior surface and an interior surface coupled with respect to the exterior surface of the second layer, the third layer formed of a coating with a diffraction grating on its interior most surface adjacent to and in facing contact with the second layer, the third layer constituting the top of a label defined by the first, second and third layers, and being of a transparent material which is an ultraviolet stabilized polymer, the third layer having a thickness of between about 0.0010 and 0.0200 inches, the third layer having a thickness of between about 0.001 and 0.0200 inches, the material of the third layer being preferably an acrylic or polyester polyurethane polymer, and constituting a flexible metalized sheet;

a fourth layer having an exterior surface and an interior surface coupled to the exterior surface of the third layer, the fourth layer being a releasable film coating selected from the class of releasable coatings including hard wax and silicone;

a fifth layer having an exterior surface and an interior surface coupled with the exterior surface of the fourth layer, the fifth layer constituting a film carrier fabricated of polyethylene terephthale;

an adhesive layer between the aluminum reflective material and the clear grating material; and a color layer between the aluminum reflective material and the hot melt adhesive.

2. A game ball with a hologram image comprising:

a first outermost layer having an exterior surface and an interior surface, the first layer formed of a coating with a diffraction grating on its interior most surface, and being of a transparent material which is an ultraviolet stabilized polymer, the material of the first layer being a polyurethane polymer and constituting a flexible metalized sheet;

a second layer having an exterior surface and an interior surface, the second layer being formed of a reflective layer of aluminum deposit vacuum; and a third innermost layer having an exterior surface and an interior surface, the third layer formed of hot melt adhesive and a game ball in a spherical configuration and having an exterior surface, the exterior surface of the game ball being coupled to the interior surface of the third innermost layer.

3. The game ball as set forth in claim 2 and further including an adhesive layer between the aluminum reflective material and the clear grating material.

4. The game ball as set forth in claim 2 and further including a color layer between the aluminum reflective material and the hot melt adhesive.

5. The game ball as set forth in claim 2 and further including an adhesive layer between the aluminum reflective material and the clear grating material and a color layer between the aluminum reflective material and the hot melt adhesive.

* * * * *